United States Patent
Huang et al.

(10) Patent No.: US 11,868,651 B2
(45) Date of Patent: Jan. 9, 2024

(54) KEY-VALUE KV STORAGE METHOD AND APPARATUS, AND STORAGE DEVICE

(71) Applicant: Huawei Technologies Co., Ltd., Shenzhen (CN)

(72) Inventors: Tao Huang, Shenzhen (CN); Siwei Luo, Chengdu (CN); Zhong Qin, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 17/669,726

(22) Filed: Feb. 11, 2022

(65) Prior Publication Data

US 2022/0164132 A1 May 26, 2022

Related U.S. Application Data

(63) Continuation of application No. PCT/CN2020/088825, filed on May 6, 2020.

(30) Foreign Application Priority Data

Aug. 13, 2019 (CN) .......................... 201910744198.7

(51) Int. Cl.
  *G06F 3/06* (2006.01)
(52) U.S. Cl.
  CPC .......... *G06F 3/0655* (2013.01); *G06F 3/0622* (2013.01); *G06F 3/0679* (2013.01)
(58) Field of Classification Search
  CPC .... G06F 3/0622; G06F 3/0655; G06F 3/0679; G06F 3/0688; G06F 12/0246; G06F 2212/1036; G06F 2212/7211; G06F 3/0604; G06F 3/0616; G06F 3/0631; G06F 3/064; G06F 3/0656; G06F 3/0658
  See application file for complete search history.

(56) References Cited

U.S. PATENT DOCUMENTS

| 10,303,382 B1 | 5/2019 | Chu et al. |
| 2010/0082890 A1 | 4/2010 | Heo et al. |
| 2014/0136760 A1 | 5/2014 | Sprouse et al. |
| 2015/0095546 A1* | 4/2015 | Bennett ................... G06F 12/00 711/5 |

(Continued)

FOREIGN PATENT DOCUMENTS

| CN | 107066498 A | 8/2017 |
| CN | 109521959 A | 3/2019 |
| EP | 3422215 A1 | 1/2019 |

*Primary Examiner* — Jane W Benner
(74) *Attorney, Agent, or Firm* — SLATER MATSIL, LLP

(57) ABSTRACT

A key-value (KV) storage method and apparatus, the method including receiving a write request, where the write request is associated with writing a first key and a first value, storing the first key in a first memory chip of a solid state drive (SSD), and storing the first value in a second memory chip of the SSD, where an erase count of the first memory chip is less than an erase count of the second memory chip, and creating a mapping relationship between the first key, a physical address of the first key, and a physical address of the first value, where the physical address of the first key indicates that the first key is stored in storage space of the first memory chip, and where the physical address of the first value indicates that the first value is stored in storage space of the second memory chip.

20 Claims, 8 Drawing Sheets

(56) References Cited

U.S. PATENT DOCUMENTS

| | | |
|---|---|---|
| 2015/0310053 A1 | 10/2015 | Kim |
| 2017/0139610 A1 | 5/2017 | Choi et al. |
| 2018/0267854 A1 | 9/2018 | Ki |
| 2019/0005079 A1* | 1/2019 | Li .................... G06F 16/2272 |
| 2019/0087114 A1 | 3/2019 | Choi |
| 2019/0115078 A1 | 4/2019 | Kim et al. |
| 2019/0243906 A1 | 8/2019 | Bisson et al. |
| 2020/0014688 A1* | 1/2020 | Kohli ................. H04L 9/0891 |
| 2021/0004177 A1* | 1/2021 | Lee .................... G06F 3/0638 |

* cited by examiner

KEY-VALUE KV STORAGE METHOD AND APPARATUS, AND STORAGE DEVICE

CROSS-REFERENCE TO RELATED APPLICATIONS

This application is a continuation of International Application No. PCT/CN2020/088825, filed on May 6, 2020, which claims priority to Chinese Patent Application No. 201910744198.7, filed on Aug. 13, 2019. The disclosures of the aforementioned applications are hereby incorporated by reference in their entireties.

TECHNICAL FIELD

This disclosure relates to the field of storage technologies, and in particular, to a key-value (KV) storage method and apparatus, and a storage device.

BACKGROUND

To support various key-value (KV) types of databases (which store data of a KV structure), a solid state disk (SSD) configured to store a KV, briefly referred to as a KV-SSD, is accordingly developed. Similar to a conventional SSD for block storage, a read granularity and a write granularity of a NAND Flash chip in the KV-SSD are one page, and a read/write characteristic is write-after-erase. That is, data on a chip cannot be updated in situ. When data needs to be changed, new data needs to be stored on an idle page, and a page on which the data is originally stored is marked as "invalid".

An existing KV-SSD stores a KV in storage space as an object, and update of data in the KV is usually update of a value. In this way, each time the value in the stored KV is updated, the KV-SSD needs to read a stored key first, and then writes the key to a new page. Obviously, the foregoing operations bring a large quantity of extra read/write operations, which seriously affect a service life of the KV-SSD.

SUMMARY

This disclosure provides a key-value (KV) storage method and apparatus, and a storage device, to resolve a problem that a service life of an SSD is severely affected by a large quantity of read/write operations.

To achieve the foregoing objective, the following technical solutions are used in this disclosure.

According to a first aspect, a key-value (KV) storage method is provided. The storage method is applied to an SSD including a first memory chip and a second memory chip, and an erase count of the first memory chip is less than an erase count of the second memory chip. After receiving a write request used to request to write a first key and a first value, the SSD stores the first key in the first memory chip, and stores the first value in the second memory chip. After storing the first key and the first value, the SSD further creates a mapping relationship between the first key, a physical address of the first key, and a physical address of the first value. Herein, the physical address of the first key is used to indicate that the first key is stored in storage space of the first memory chip, and the physical address of the first value is used to indicate that the first value is stored in storage space of the second memory chip.

The erase count of the first memory chip is less than the erase count of the second memory chip. By using this characteristic, the SSD respectively stores a key and a value in different memory chips. In this way, when a value in a key-value needs to be updated, the SSD does not need to read a key, but directly update the value. Compared with an existing technology, the storage method provided in this embodiment of the present invention does not involve an additional read/write operation, thereby effectively prolonging a service life of the SSD.

Optionally, in a possible implementation of this disclosure, the SSD further receives a first request including the first key, where the first request is used to request to process a value corresponding to the first key. Correspondingly, when determining that the mapping relationship includes the first key, the SSD obtains, from the mapping relationship, the physical address of the first value corresponding to the physical address of the first key, and processes the first value based on the physical address of the first value.

Optionally, in a possible implementation of this disclosure, the first request is specifically used to read the first value corresponding to the first key.

Optionally, in a possible implementation of this disclosure, the first request is specifically used to delete the first value corresponding to the first key. Correspondingly, in such a scenario, the method in which "the SSD processes the first value based on the physical address of the first value" includes: The SSD adds a first invalid identifier to the storage space indicated by the physical address of the first value. In addition, the SSD further adds a second invalid identifier to the storage space indicated by the physical address of the first key, and deletes the mapping relationship.

A read/write characteristic of a memory chip in the SSD is write-after-erase, and data cannot be updated in situ. Therefore, when deleting the first key and the first value, the SSD adds the first invalid identifier to the storage space indicated by the physical address of the first value, and adds the second invalid identifier to the storage space indicated by the physical address of the first key. To keep consistency of data, the SSD further deletes the mapping relationship.

Optionally, in a possible implementation of this disclosure, the first request further includes a second value, the first request is specifically used to update the first value corresponding to the first key in the second value. Correspondingly, in such a scenario, the method in which "the SSD processes the first value based on the physical address of the first value" includes: The SSD adds a first invalid identifier to the storage space indicated by the physical address of the first value. In addition, the SSD further determines a first physical address, stores the second value at the first physical address, and updates the physical address of the first value in the mapping relationship in the first physical address, where the first physical address is used to indicate storage space in which no data is stored in the second memory chip.

A read/write characteristic of a memory chip in the SSD is write-after-erase, and data cannot be updated in situ. Therefore, when updating the first value to the second value, the SSD adds the first invalid identifier to the storage space indicated by the physical address of the first value, and stores the second value in the storage space in which no data is stored. To keep consistency of data, the SSD further updates the mapping relationship.

Optionally, in a possible implementation of this disclosure, the SSD further obtains an update frequency of a value corresponding to the first key within a preset period, if the update frequency is less than the preset threshold, the SSD migrates the value currently corresponding to the first key to the first memory chip, and updates a physical address of the value corresponding to the first key in the mapping relationship to a physical address obtained after the migration.

The update frequency is an update quantity of the value corresponding to the first key within the preset period. Optionally, each time the value corresponding to the first key is updated, the SSD increases the update quantity by one. If the update frequency is less than the preset threshold within the preset period, it indicates that the value corresponding to the first key is cold data. The SSD may store the cold data in a memory chip with a relatively long write delay and a relatively large unit storage capacity. The memory chip with a relatively long write delay and a relatively large unit storage capacity has a relatively small erase count. Therefore, the SSD may store the cold data in the first memory chip. The first memory chip and the second memory chip are both deployed in the SSD. Therefore, the migration of the value corresponding to the first key is completed in the same SSD, and does not occupy a bandwidth outside the disk or affect a current service.

According to a second aspect, a key-value (KV) storage apparatus is provided. The storage apparatus can implement the functions in any one of the first aspect and the possible implementations of the first aspect. These functions may be implemented by hardware, or may be implemented by hardware executing corresponding software. The hardware or software includes one or more modules corresponding to the foregoing functions.

In a possible manner of this disclosure, the storage apparatus may include a receiving unit, a storage unit, and a processing unit. The receiving unit, the storage unit, and the processing unit may perform the corresponding functions in the key-value (KV) storage method in any one of the first aspect and the possible implementations of the first aspect. For example, the receiving unit is configured to receive a write request, where the write request includes a first key and a first value, and the write request is used to request to write the first key and the first value, the storage unit is configured to: store, in a first memory chip, the first key received by the receiving unit, and store the first value in a second memory chip, and the processing unit is configured to create a mapping relationship between the first key, a physical address of the first key, and a physical address of the first value, where the physical address of the first key is used to indicate that the first key is stored in storage space of the first memory chip, and the physical address of the first value is used to indicate that the first value is stored in storage space of the second memory chip.

According to a third aspect, a storage device is provided, and is configured to perform the key-value (KV) storage method according to the first aspect and the possible implementations of the first aspect.

Optionally, the device further includes a transceiver. The transceiver may be configured to perform the step of receiving and sending data, signaling, or information in the key-value (KV) storage method in any one of the first aspect and the possible implementations of the first aspect, for example, receiving a write request.

According to a fourth aspect, a computer-readable storage medium is further provided. The computer-readable storage medium stores computer instructions. When the computer instructions are run on a computer, the computer is enabled to perform the key-value (KV) storage method according to any one of the first aspect and various possible implementations of the first aspect.

According to a fifth aspect, a computer program product is further provided. The computer program product includes computer instructions. When the computer instructions are run on a computer, the computer is enabled to the key-value (KV) storage method according to any one of the first aspect and the possible implementations of the first aspect.

It should be noted that all or some of the computer instructions may be stored in a computer storage medium. The computer storage medium may be encapsulated together with a processor, or the computer storage medium and the processor may be encapsulated separately. This is not limited in this disclosure.

For descriptions of the second aspect, the third aspect, the fourth aspect, the fifth aspect, and the implementations thereof, refer to the detailed descriptions of the first aspect and the implementations of the first aspect. In addition, for beneficial effects of the second aspect, the third aspect, the fourth aspect, the fifth aspect, and the implementations thereof, refer to the analysis of the beneficial effects of the first aspect and the implementations of the first aspect, and details are not described herein again.

In this disclosure, a name of the key-value (KV) storage apparatus constitutes no limitation on the device or the function module. During actual implementation, the device or the function module may use another name. The device or function module falls within the scope of the claims of this disclosure and equivalent technologies of the claims provided that functions of the device or function module are similar to those in this disclosure.

These or other aspects of this disclosure will become more concise and understandable in the following descriptions.

DETAILED DESCRIPTION OF ILLUSTRATIVE EMBODIMENTS

A flash memory, also called a flash, is the first choice of mainstream storage devices to replace disks with advantages such as high data storage speed, energy saving, low noise, shockproof, small size, and uneasy data loss after power failure. An SSD whose medium is a NAND Flash chip is widely used in storage devices.

Figure 1:
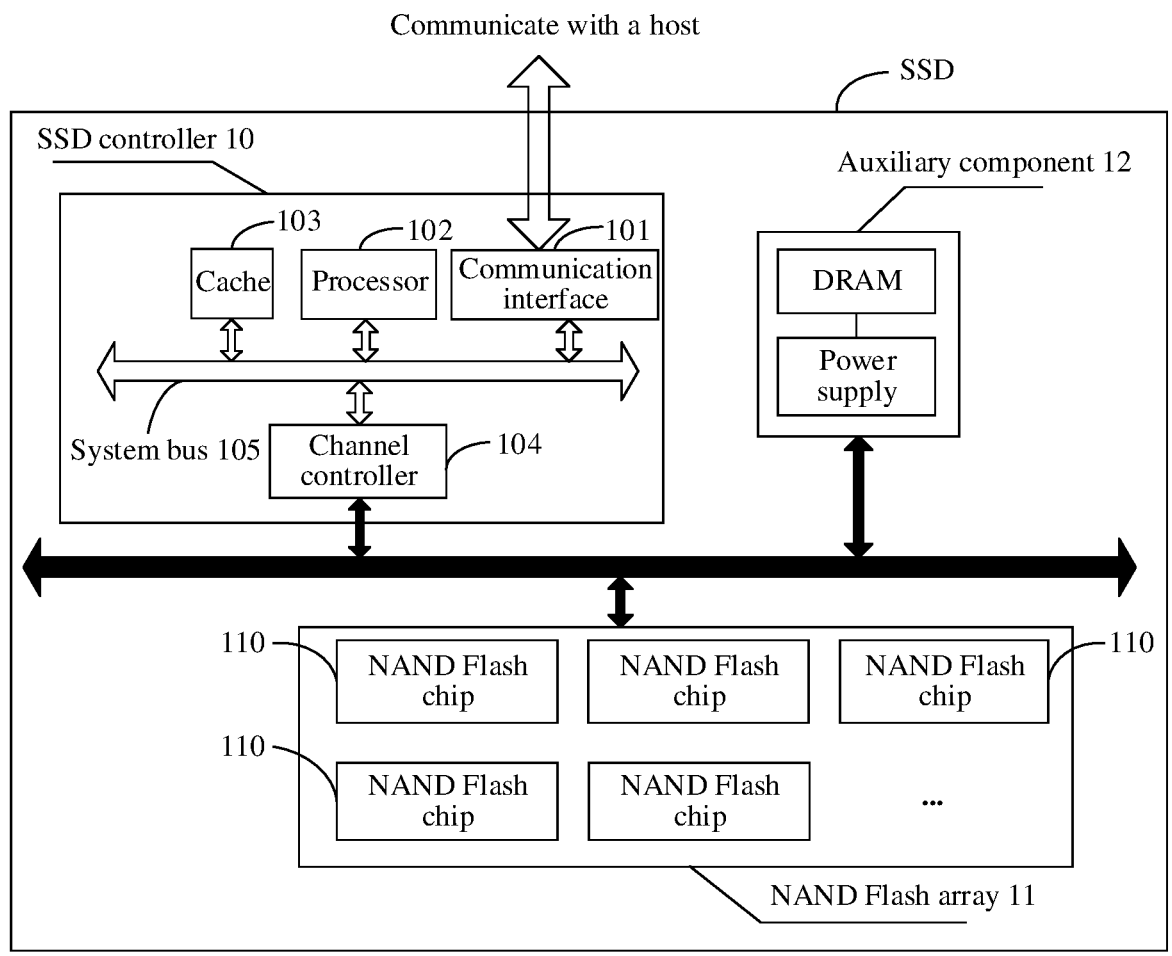
FIG. 1 is a schematic diagram of a hardware structure of an SSD according to an embodiment of the present invention.

Generally, the SSD includes an SSD controller, a NAND Flash array, and an auxiliary component. FIG. 1 shows a hardware structure of an SSD according to an embodiment of the present invention. As shown in FIG. 1, in this embodiment of this disclosure, the SSD includes an SSD controller 10, a NAND Flash array 11, and an auxiliary component 12.

The SSD controller 10 mainly includes a communication interface 101, a processor 102, a cache 103, a channel controller 104, and a system bus 105. The communication interface 101, the processor 102, the cache 103, and the channel controller 104 communicate with each other by using the system bus 105.

The communication interface 101 may be a serial attached SCSI (SAS), a serial advanced technology attachment (SATA), or the like, and is configured to communicate with another device (such as a host).

The processor 102 may be a central processing unit (CPU), an application-specific integrated circuit (ASIC), or one or more integrated circuits configured to implement this embodiment of the present invention. In this embodiment of the present invention, the processor 102 may be configured to: receive a write request or a read request from the host, process the write request or the read request, send the write request or the read request to the NAND Flash array 11, and perform another operation.

The processor 102 may further include a cache (not shown in FIG. 1), configured to store various program instructions. For example, the cache may include a flash translation layer (FTL). In this embodiment of the present invention, the FTL may be understood as a metadata table. For a function of the FTL, refer to the following description. Alternatively, the processor 102 may implement a similar function of a metadata table by using another software module.

The cache 103 is configured to cache data received from a peripheral (such as a host) or data read from the NAND Flash array 11. The cache 103 may be any non-transitory machine-readable medium that can store data, such as a random access memory (RAM), a read-only memory (ROM), or a flash memory. This is not limited herein. For example, when a write request sent by the host is received, the write request may be stored in the cache 103 and processed by the processor 102. In addition, in some application scenarios, the cache 103 may be placed outside the SSD controller 10.

Optionally, the cache in the processor 102 may be integrated with the cache 103, or may be independently disposed. This is not limited in this embodiment of this disclosure.

The channel controller 104 is configured to communicate with the NAND Flash array 11.

The NAND Flash array 11 includes several NAND Flash chips 110. The several NAND Flash chips 110 are connected in the SSD through channels. Concurrent processing of write requests may be implemented between the channels. For example, if the SSD controller 10 receives a plurality of write requests, each of a plurality of channels may execute one write request, thereby improving efficiency of processing the write requests.

Each NAND Flash chip 110 in the NAND Flash array 11 corresponds to one channel of the channel controller 104. To improve reliability, one channel in the channel controller 104 is usually reserved for error checking and correcting (ECC) verification.

A read granularity and a write granularity of each NAND Flash chip 110 are one page, and a read/write characteristic is write-after-erase. That is, data on a chip cannot be updated in situ. When data needs to be changed, new data needs to be stored on an idle page, and a page on which the data is originally stored is marked as "invalid".

The auxiliary component 12 includes a component that supports system operation, such as a dynamic random access memory (DRAM) or a power supply.

The NAND Flash chip 110 has undergone four generations of changes so far, and each generation of changes is mainly reflected in a size of data stored in a single storage unit.

The first-generation NAND Flash chip uses a technology of storing 1-bit data in a single storage unit (SLC). A single storage unit can store only 1-bit data. The NAND Flash chip is also referred to as an SLC chip. The second-generation NAND Flash chip uses a technology of storing 2-bit data in a single storage unit (MLC). A single storage unit may store 2-bit data. The NAND Flash chip is also referred to as an MLC chip. The third-generation NAND Flash chip uses a technology of storing 3-bit data in a single storage unit (TLC). A single storage unit may store 3-bit data. The NAND Flash chip is also referred to as a TLC chip. The fourth-generation NAND Flash chip uses a technology of storing 4-bit data in a single storage unit (QLC). A single storage unit may store 4-bit data. The NAND Flash chip is also referred to as a QLC chip.

Although each generation of NAND Flash chip has improved in storage density, an erase count and a write delay of the chip are also lost while the storage density is improved. Compared with a large erase count (for example, 100000 times) and high read/write performance of the SLC chip, an erase count (for example, only about woo times) of the QLC chip is much shorter, and a read/write delay of the QLC chip is definitely longer than a read/write delay of the SLC chip. The following Table 1 shows read delays, write delays, erase delays, and erase counts of the four types of NAND Flash chips.

TABLE 1

| Chip type | Read delay (microsecond) | Write delay (microsecond) | Erase delay (microsecond) | Erase count |
| --- | --- | --- | --- | --- |
| SLC | 25 | 200 to 300 | 1500 to 2000 | 100 KB |
| MLC | 50 | 600 to 900 | ~3000 | ~10 KB |
| TLC | ~75 | ~900 to 1350 | ~4500 | ~3 KB |
| QLC | 122 | 2705 | 15000 | ~1 KB |

In Table 1, "~" represents "about". For example, the read delay of the TLC chip is about 75 microseconds (μs) or about 75 μs. It can be learned from Table 1 that the read delays, the write delays, and the erase delays of the SLC chip, the MLC chip, the TLC chip, and the QLC chip all increase sequentially, and the erase counts of the SLC chip, the MLC chip, the TLC chip, and the QLC gradually decrease. Compared with the write delays and the erase delays, the read delays increase at a relatively small granularity. Therefore, it may be considered that chip upgrade has a relatively small impact on the read delay.

Figure 2:
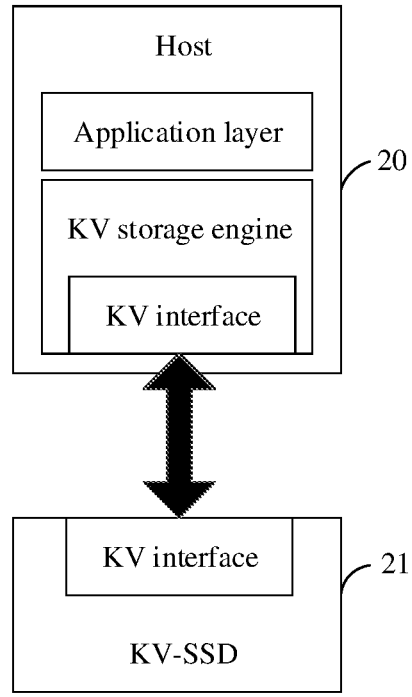
FIG. 2 is a schematic architectural diagram of a storage system according to an embodiment of the present invention.

Currently, a KV-SSD is widely used in the industry. The KV-SSD stores data of a KV structure. The communication interface included in the SSD controller in the KV-SSD may be a KV interface, and is used to directly connect to a KV database at an upper layer (on a host side). FIG. 2 shows an architecture of a storage system including a host 20 and a KV-SSD 21. As shown in FIG. 2, the KV interface in the KV-SSD 21 directly connects to a KV storage engine of a KV database in the host 20. In this way, data can be read and written only after the KV-SSD 21 completes mapping from a KV to a physical address in a NAND Flash array. The KV-SSD 21 has low a read/write delay and high performance. For a hardware structure of the KV-SSD 21 in FIG. 2, refer to FIG. 1. The host 20 further includes an application layer communicating with the KV storage engine.

An existing KV-SSD stores a KV in storage space as an object, and update of data in the KV is usually update of a value. In this way, each time the value in the stored KV is updated, the KV-SSD needs to read a stored key from an old page first, and then writes the key to a new page. Obviously, the foregoing operations bring a large quantity of extra read/write operations, which seriously affect a service life of the KV-SSD.

Therefore, an embodiment of the present invention provides a key-value (KV) storage method. The storage method is applied to an SSD (which may be specifically a KV-SSD) including a first memory chip and a second memory chip. An erase count of the first memory chip is less than an erase count of the second memory chip. By using this characteristic, the SSD respectively stores a key and a value in a key-value in the first memory chip and the second memory chip, and records a mapping relationship between a physical address of the key and a physical address of the value. In this way, when a value in a key-value needs to be updated, the SSD does not need to read a key, but directly update the value. Compared with an existing technology, the storage method provided in this embodiment of the present invention does not involve an additional read/write operation, thereby effectively prolonging a service life of the SSD.

The storage method provided in this embodiment of the present invention is applicable to a storage system including a host and a KV-SSD. For an architecture of the storage system, refer to FIG. 2. Certainly, another device may be further included between the host and the KV-SSD, for example, a storage controller. The storage controller interacts with the host, may receive a message/command sent by the host, and is configured to manage the KV-SSD. A device other than the host and the KV-SSD is not shown in FIG. 2.

The host 20 in FIG. 2 may be any system and/or apparatus that needs to write data or read data and that communicates with the KV-SSD 21. For example, the host 20 may be a computing device, a personal computer, a portable computer, a workstation, a server, a router, a network apparatus, a personal digital assistant, a digital camera, a digital telephone, or a combination thereof. The host 20 may include several hosts.

In actual application, the host 20 and the KV-SSD 21 may be integrated into one storage device. For example, the host 20 includes the KV-SSD 21, or the host 20 and the KV-SSD 21 are located in two devices that are independent of each other. For example, the KV-SSD 21 is remote relative to the host 20, and the host 20 communicates with the KV-SSD 21 through a wireless communication link. A location relationship between the host 20 and the KV-SSD 21 is not limited in this embodiment of the present invention.

Specifically, the host 20 may send a write request to the KV-SSD 21. After receiving the write request, an SSD controller in the KV-SSD 21 writes a key-value carried in the write request to a NAND Flash array. In addition, the host 20 may further send a read request to the KV-SSD 21. After receiving the read request, the SSD controller in the KV-SSD 21 determines whether a key in the read request is stored. If the key in the read request is stored, the SSD controller determines a physical address of a value corresponding to a physical address of the key, obtains the value based on the determined physical address, and directly sends the obtained value to the host 20. If the key in the read request is not stored, the SSD controller sends, to the host 20, a message used to indicate that a value corresponding to the key does not exist.

In addition, the host 20 may further send an update request, a delete request, and the like to the KV-SSD 21. The requests are not enumerated herein.

Optionally, in this embodiment of the present invention, a request sent by the host 20 to the KV-SSD 21 may be specifically a key-value store (KVS) command. The KVS command is a read command (GET), a write command (PUT), a delete command (DELETE), an update command (UPDATE), or the like.

For a hardware structure of the KV-SSD 21 in this embodiment of the present invention, refer to FIG. 1. It should be noted that the NAND Flash array in the KV-SSD 21 includes at least two types of NAND Flash chips, for example, at least two of an SLC chip, an MLC chip, a TLC chip, and a QLC chip.

In this embodiment of the present invention, a first memory chip may be one of an SLC chip, an MLC chip, a TLC chip, or a QLC chip; and a second memory chip may be one of an SLC chip, an MLC chip, a TLC chip, or a QLC chip whose erase count is greater than that of the first memory chip. For example, the first memory chip is a QLC chip, and the second memory chip is an SLC chip.

There may be one or more first memory chips and one or more second memory chips in the KV-SSD 21. This is not specifically limited in this embodiment of the present invention.

In this embodiment of the present invention, the first memory chip is pre-configured to store a key, and the second memory chip is pre-configured to store a value.

With reference to the SSD shown in FIG. 1 and the storage system shown in FIG. 2, the following describes the key-value (KV) storage method provided in the embodiments of the present invention. The storage method may be applied to the KV-SSD 21 shown in FIG. 2. The following steps are performed by the SSD controller in the KV-SSD 21 unless otherwise stated.

For ease of understanding, in the embodiments of the present invention, an example in which the KV-SSD 21 includes an SLC chip and a QLC chip is used for description.

Figure 3:
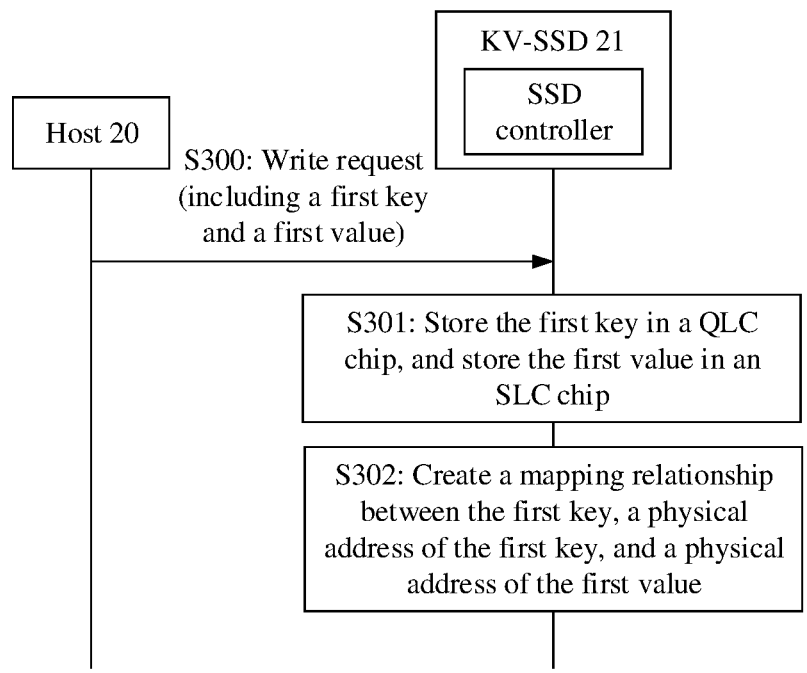
FIG. 3 is a first schematic flowchart of a key-value (KV) storage method according to an embodiment of the present invention.

As shown in FIG. 3, the key-value (KV) storage method provided in the embodiments includes the following steps:

S300: The host 20 sends a write request including a first key and a first value to the KV-SSD 21, to request to write the first key and the first value.

S301: The SSD controller in the KV-SSD 21 stores the first key in the QLC chip, and stores the first value in the SLC chip.

Specifically, the SSD controller stores the first key on a blank page in the QLC chip. In this embodiment, a physical address of the first key is used to indicate that the first key is stored in storage space of the QLC chip, in other words, the physical address of the first key represents the blank page in the QLC chip on which the first key is stored.

The SSD controller further stores the first value on a blank page in the SLC chip. In this embodiment, a physical address of the first value is used to indicate that the first key is stored in storage space of the SLC chip, in other words, the physical address of the first value represents the blank page in the SLC chip on which the first value is stored.

Figure 4:
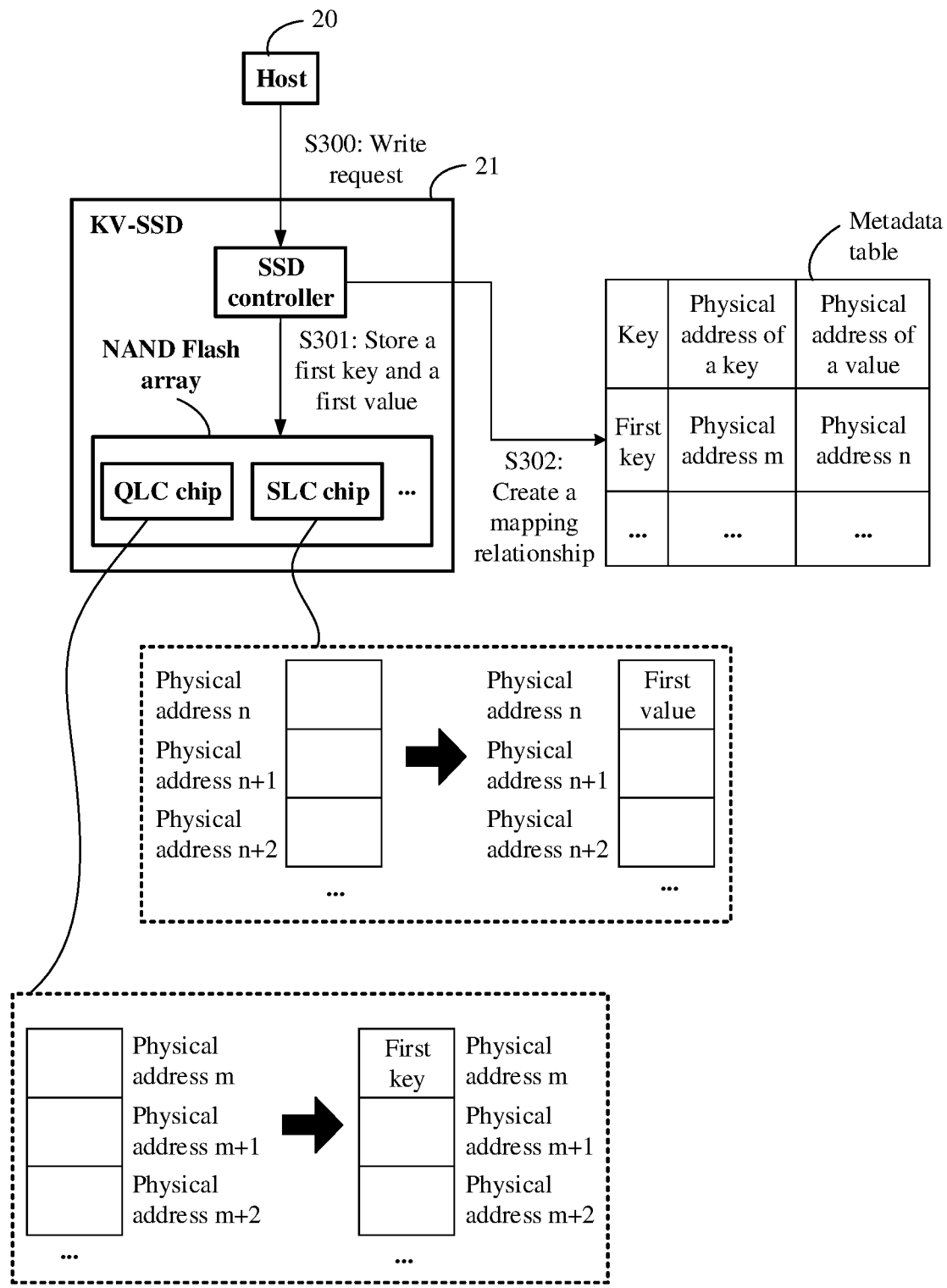
FIG. 4 is a schematic flowchart of writing a first key and a first value according to an embodiment of the present invention.

For example, as shown in FIG. 4, in the SLC chip and the QLC chip in FIG. 4, rectangular boxes represent pages, and blank rectangular boxes represent blank pages. If one physical address corresponds to one page, in the SLC chip, a physical address of a page o is n, a physical address of a page 1 is n+1, and the rest may be deduced by analogy. Similarly, in the QLC chip, a physical address of a page o is m, a physical address of a page 1 is m+1, and the rest may be deduced by analogy. The SSD controller stores the first key on the page o in the QLC chip, that is, stores the first key at the physical address m. The SSD controller stores the first value on the page o in the SLC chip, that is, stores the first value at the physical address n.

S302: The SSD controller creates a mapping relationship between the first key, the physical address of the first key, and the physical address of the first value.

The mapping relationship between the first key, the physical address of the first key, and the physical address of the first value may be stored in a metadata table. The metadata table includes a mapping relationship, stored in the KV-SSD, between a key in each key-value pair, a physical address of a key, and a physical address of a value.

The metadata table may be stored in a cache of the SSD controller, or the metadata table in the cache may be periodically stored in a NAND Flash chip (such as the SLC chip), in the NAND Flash array, having high performance and a relatively large erase count. This is not limited in this embodiment of the present invention.

For example, as shown in FIG. 4, after storing the first key at the physical address m and storing the first value at the physical address n, the SSD controller stores a mapping relationship between the physical address m and the physical address n in the metadata table.

After storing the first key and the first value, the host 20 may further request to read a value corresponding to the first key, that is, request to read the first value. A process in which the host 20 requests to read the first value is described below.

Figure 5:
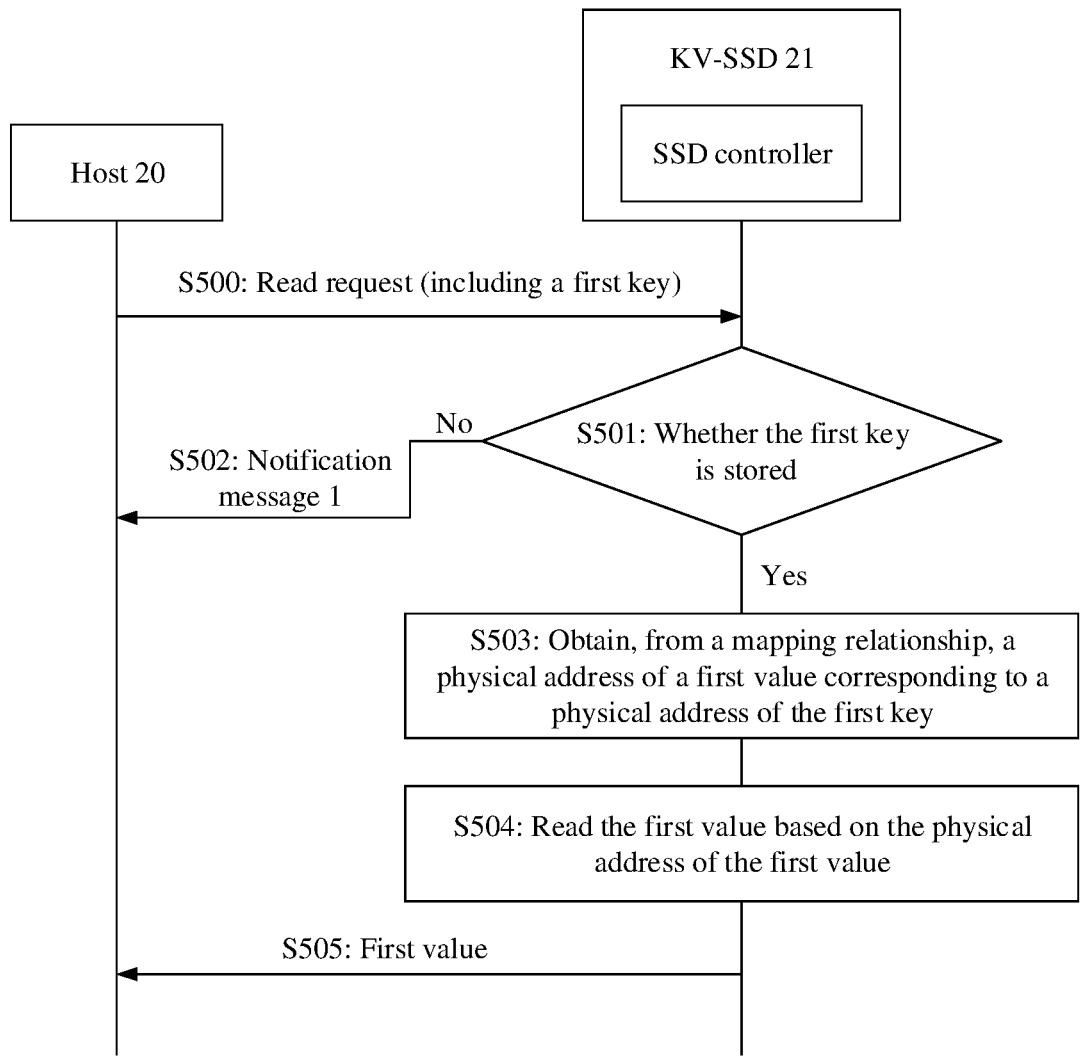
FIG. 5 is a second schematic flowchart of a key-value (KV) storage method according to an embodiment of the present invention.

Based on FIG. 3, as shown in FIG. 5, the key-value (KV) storage method provided in the embodiments includes the following steps:

S500: The host 20 sends a read request including the first key to the KV-SSD 21, to request to read the value corresponding to the first key.

S501: The SSD controller in the KV-SSD 21 determines whether the first key is stored.

After receiving the read request, the SSD controller queries whether the mapping relationship includes the first key. If the mapping relationship does not include the first key, in other words, the first key is not stored, the SSD controller continues to perform S502, or if the mapping relationship includes the first key, in other words, the first key is stored, the SSD controller continues to perform S503 to S505.

S502: The SSD controller sends, to the host 20, a notification message 1 used to indicate that the value corresponding to the first key does not exist.

If the QLC chip has not stored the first key, it indicates that the KV-SSD 21 has not stored the first key and the value corresponding to the first key. Therefore, the SSD controller sends, to the host 20, the notification message 1 used to indicate that the value corresponding to the first key does not exist.

S503: The SSD controller obtains, from the mapping relationship, the physical address of the first value corresponding to the physical address of the first key.

If the QLC chip has stored the first key, it indicates that the mapping relationship in the KV-SSD 21 includes the physical address of the first key and a physical address of the value corresponding to the first key (assuming that the value is the first value).

After finding the first key in the QLC chip, the SSD controller determines the physical address of the first key. Further, the SSD controller obtains, from the mapping relationship based on the physical address of the first key, the physical address of the first value corresponding to the physical address of the first key.

S504: The SSD controller reads the first value based on the obtained physical address.

For example, based on FIG. 4, the SSD controller determines that the physical address of the first key is the physical address m, and finds, from the metadata table, that the physical address corresponding to the physical address m is the physical address n. In this case, the SSD controller reads the first value from the physical address n.

S505: The SSD controller sends the first value to the host.

In addition to the foregoing write procedure (as shown in FIG. 3) and read procedure (as shown in FIG. 5), the host 20 may further request to update the first value to a second value. This is described herein.

Figure 6:
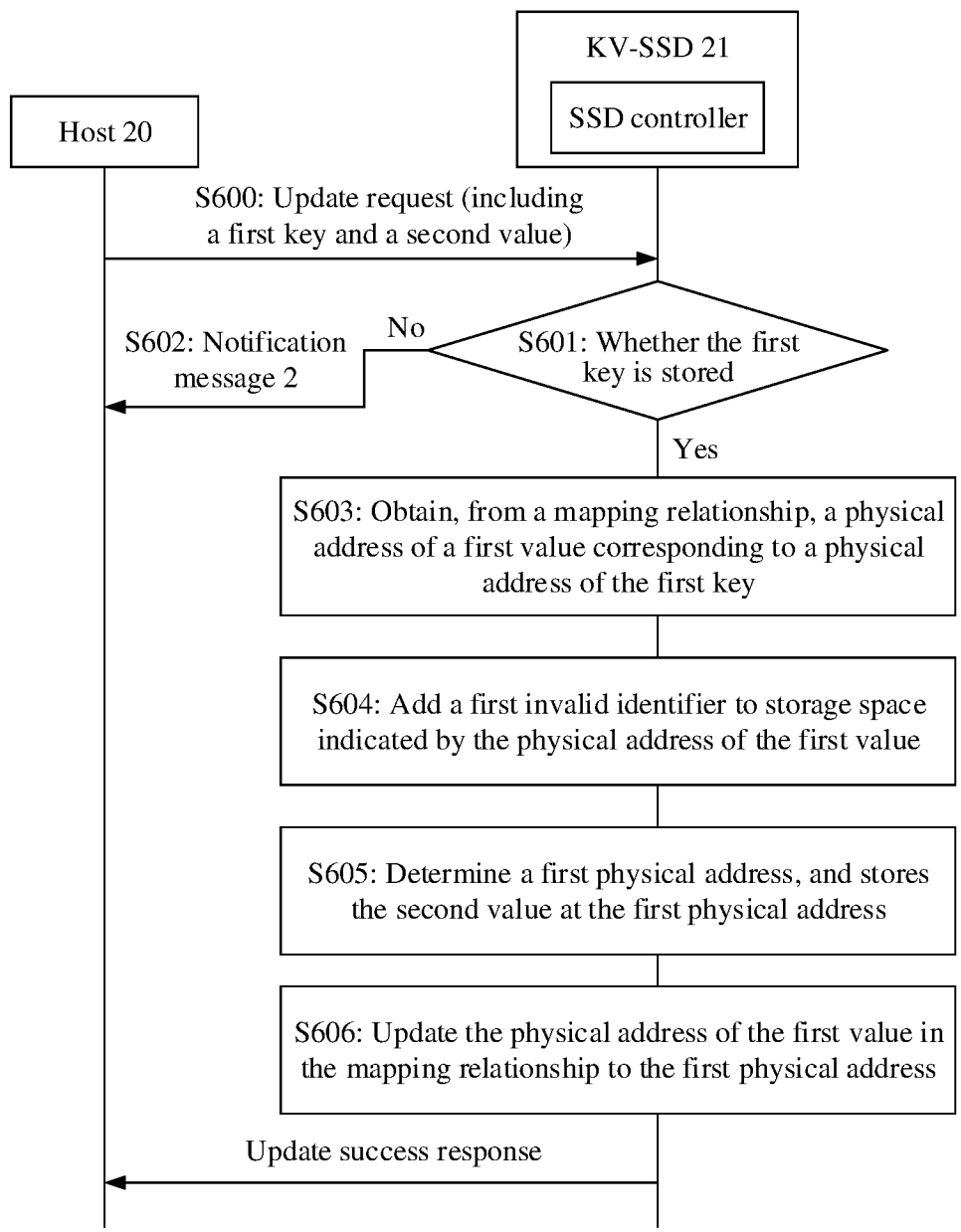
FIG. 6 is a third schematic flowchart of a key-value (KV) storage method according to an embodiment of the present invention.

Based on FIG. 3, as shown in FIG. 6, the key-value (KV) storage method provided in the embodiments includes the following steps:

S600: The host 20 sends an update request including the first key and the second value to the KV-SSD 21, to request to update the value corresponding to the first key to the second value.

S601: The SSD controller in the KV-SSD 21 determines whether the first key is stored.

After receiving the update request, the SSD controller queries whether the mapping relationship includes the first key. If the mapping relationship does not include the first key, in other words, the first key is not stored, the SSD controller continues to perform S602, or if the mapping relationship includes the first key, in other words, the first key is stored, the SSD controller continues to perform S603 to S606.

S602: The SSD controller sends, to the host 20, a notification message 2 used to indicate that the value corresponding to the first key does not exist.

If the QLC chip has not stored the first key, it indicates that the KV-SSD 21 has not stored the first key and the value corresponding to the first key. Therefore, the SSD controller sends, to the host 20, the notification message 2 used to indicate that the value corresponding to the first key does not exist.

S603: The SSD controller obtains, from the mapping relationship, the physical address of the first value corresponding to the physical address of the first key.

If the QLC chip has stored the first key, it indicates that the mapping relationship in the KV-SSD 21 includes the physical address of the first key and a physical address of the value corresponding to the first key (assuming that the value is the first value).

After finding the first key in the QLC chip, the SSD controller determines the physical address of the first key. Further, the SSD controller obtains, from the mapping relationship based on the physical address of the first key, the physical address of the first value corresponding to the physical address of the first key.

S604: The SSD controller adds a first invalid identifier to storage space indicated by the physical address of the first value.

S605: The SSD controller determines a first physical address, and stores the second value at the first physical address.

The first physical address is used to indicate storage space in which no data is stored in the SLC chip. The storage space indicated by the first physical address may be a blank page.

Figure 7:
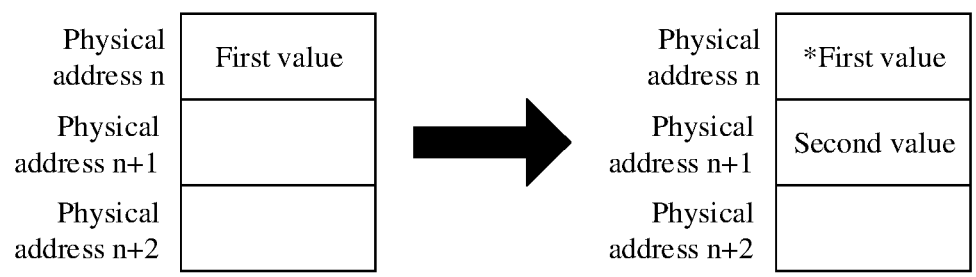
FIG. 7 is a schematic flowchart of updating a first value according to an embodiment of the present invention.

For example, with reference to FIG. 4, as shown in FIG. 7, rectangular boxes represent pages, and blank rectangular boxes represent blank pages. The SSD controller determines that the physical address of the first key is the physical address m, and finds, from the metadata table, that the physical address corresponding to the physical address m is the physical address n. In this case, the SSD controller adds the first invalid identifier to a page indicated by the physical address n, and writes the second value on a page (where this page is a blank page) whose physical address is n+1. In FIG. 7, "*" is used to represent being invalid. In any example in the embodiments of the present invention, "*" is used to represent being invalid.

Optionally, after storing the second value at the first physical address, the SSD controller sends an update success response to the host 20.

S606: The SSD controller updates the physical address of the first value in the mapping relationship to the first physical address.

The value corresponding to the first key has been updated from the first value to the second value. Therefore, to ensure consistency of data, the SSD controller updates the physical address of the first value in the mapping relationship to the first physical address. In this way, subsequently, when the host 20 requests to read the value corresponding to the first key, the SSD controller determines the first physical address based on the physical address of the first key and the first physical address in the mapping relationship, and further obtains the second value.

In the storage method provided in the embodiments of the present invention, the host 20 may further request to delete the first key and the first value. This is described herein.

Figure 8:
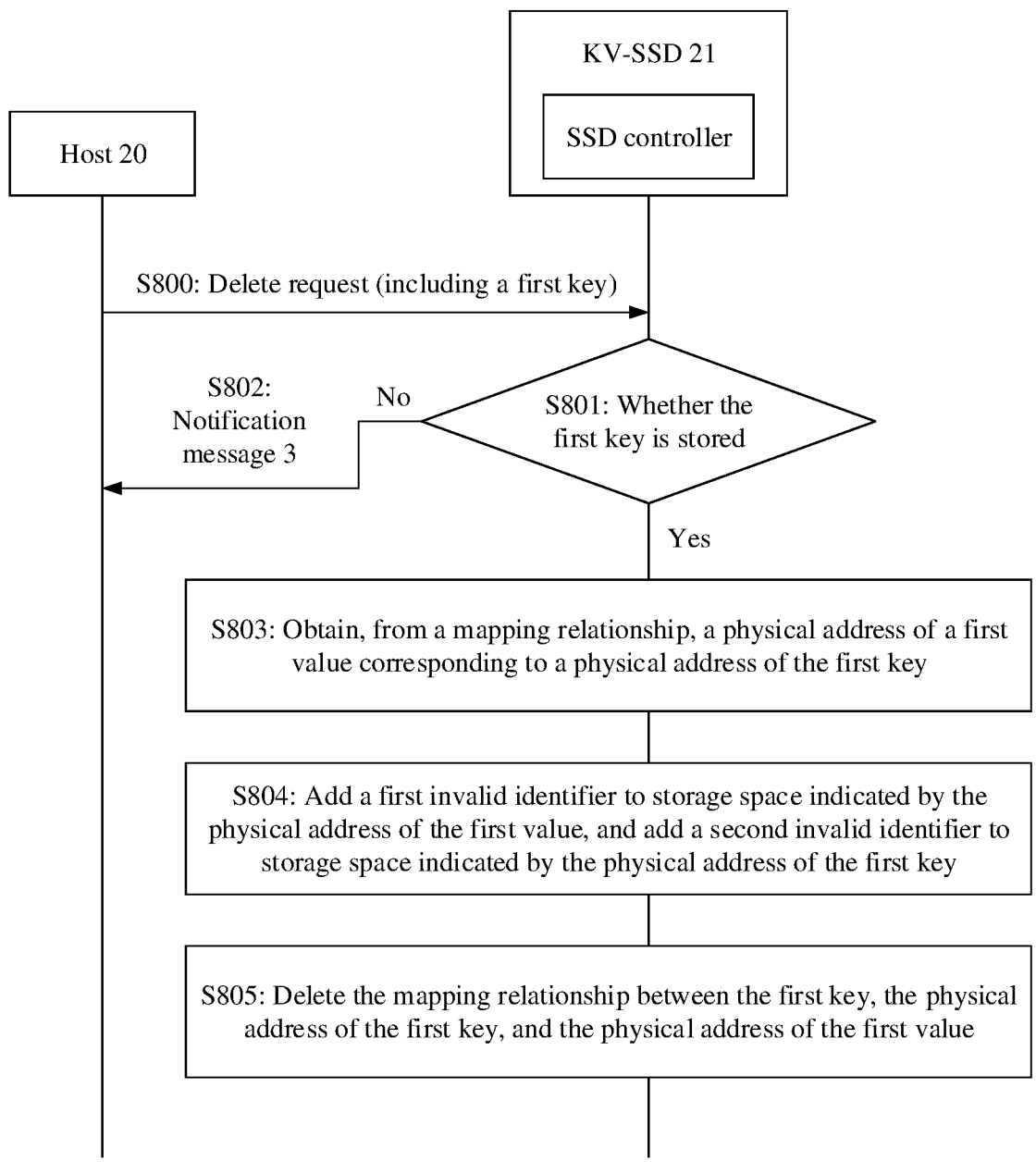
FIG. 8 is a fourth schematic flowchart of a key-value (KV) storage method according to an embodiment of the present invention.

Based on FIG. 3, as shown in FIG. 8, the key-value (KV) storage method provided in the embodiments includes the following steps:

S800: the host 20 sends a delete request including the first key to the KV-SSD 21, to request to delete the first key and the value corresponding to the first key.

S801: The SSD controller in the KV-SSD 21 determines whether the first key is stored.

After receiving the delete request, the SSD controller queries whether the mapping relationship includes the first key. If the mapping relationship does not include the first key, in other words, the first key is not stored, the SSD controller continues to perform S802, or if the mapping relationship includes the first key, in other words, the first key is stored, the SSD controller continues to perform S803 to S805.

S802: The SSD controller sends, to the host 20, a notification message 3 used to indicate that the value corresponding to the first key does not exist.

If the QLC chip has not stored the first key, it indicates that the KV-SSD 21 has not stored the first key and the value corresponding to the first key. Therefore, the SSD controller sends, to the host 20, the notification message 3 used to indicate that the value corresponding to the first key does not exist.

S803: The SSD controller obtains, from the mapping relationship, the physical address of the first value corresponding to the physical address of the first key.

If the QLC chip has stored the first key, it indicates that the mapping relationship in the KV-SSD 21 includes the physical address of the first key and a physical address of the value corresponding to the first key (assuming that the value is the first value).

After finding the first key in the QLC chip, the SSD controller determines the physical address of the first key. Further, the SSD controller obtains, from the mapping relationship based on the physical address of the first key, the physical address of the first value corresponding to the physical address of the first key.

S804: The SSD controller adds a first invalid identifier to storage space indicated by the physical address of the first value, and adds a second invalid identifier to storage space indicated by the physical address of the first key.

For details about S804, refer to the description of FIG. 8, and details are not described herein again.

S805: The SSD controller deletes the mapping relationship between the first key, the physical address of the first key, and the physical address of the first value.

In conclusion, in the embodiments of the present invention, the key and the value are separately stored in different types of memory chips (specifically, the NAND Flash chips), and a mapping relationship between the key, a physical address of the key, and a physical address of the value is recorded. In this way, when a value in a key-value needs to be updated, the KV-SSD does not need to read a key, but directly update the value. Compared with an existing technology, the storage method provided in the embodiments of the present invention does not involve an additional read/write operation, thereby effectively prolonging a service life of the KV-SSD.

In addition, the KV-SSD includes different types of memory chips, and characteristics of various types of memory chips can be fully utilized, thereby improving overall performance of the KV-SSD, and effectively reducing costs of the KV-SSD.

Usually, a read/write frequency of some data in a storage device is relatively high, for example, greater than a first threshold, and the data is hot data. Certainly, a read/write frequency of some data in the storage device is relatively low, for example, less than a second threshold, and the data is cold data.

As can be learned with reference to the foregoing description, chip upgrade has a relatively small impact on a read delay. When cold data exists in the KV-SSD, the KV-SSD may migrate the cold data to a memory chip with a relatively long write delay and a relatively large unit storage capacity, to improve performance of the KV-SSD.

Figure 9:
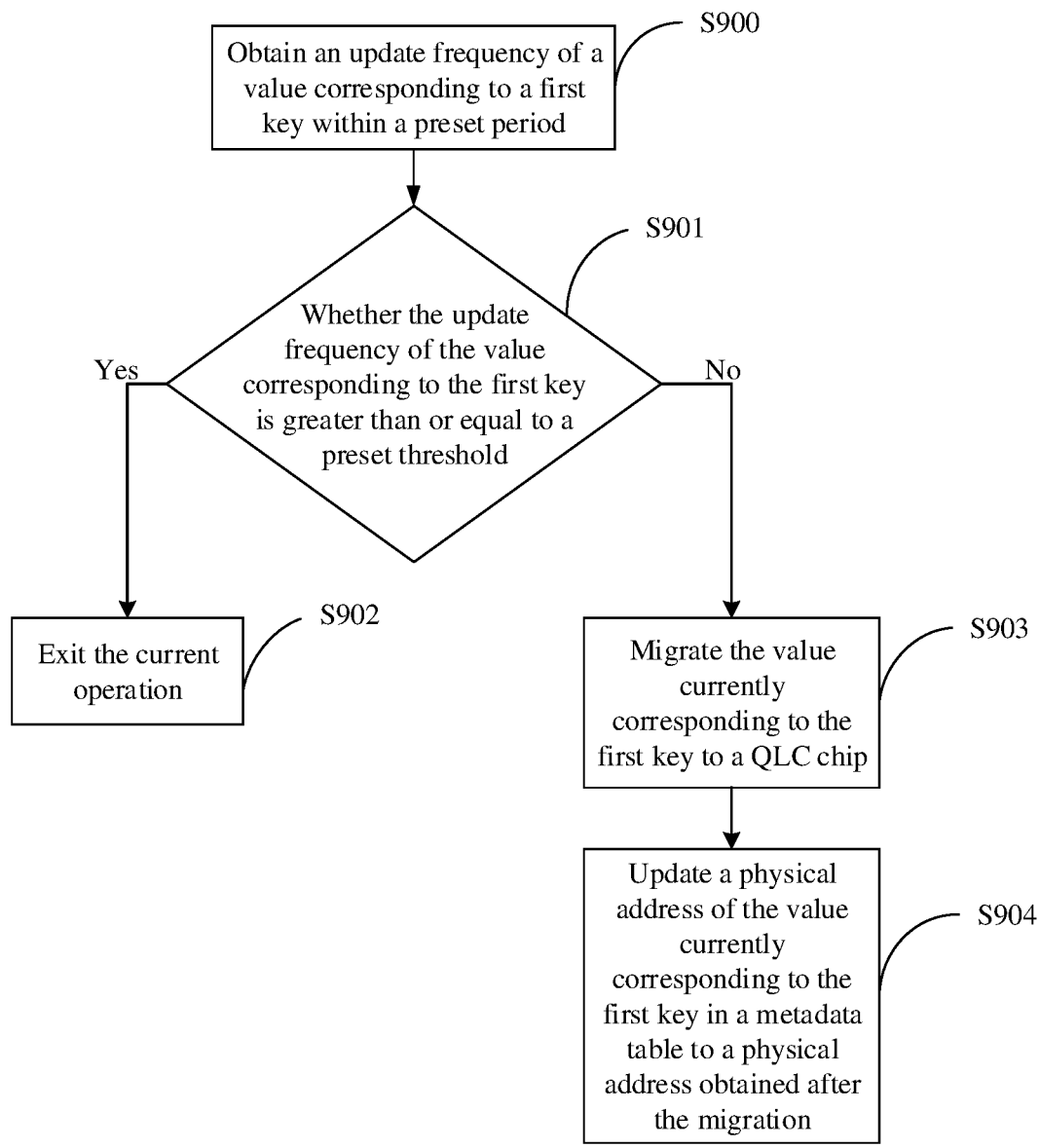
FIG. 9 is a fifth schematic flowchart of a key-value (KV) storage method according to an embodiment of the present invention.

Specifically, based on FIG. 3, as shown in FIG. 9, the key-value (KV) storage method provided in the embodiments includes the following steps:

S900: The SSD controller in the KV-SSD 21 obtains an update frequency of a value corresponding to the first key within a preset period.

Optionally, the mapping relationship may further include the update frequency of the value corresponding to the first key.

The SSD controller may periodically calculate the update frequency of the value corresponding to the first key within the preset period, and performs a subsequent step each time after the calculation.

S901: The SSD controller determines whether the update frequency of the value corresponding to the first key is greater than or equal to a preset threshold.

If the update frequency of the value corresponding to the first key is greater than or equal to the preset threshold, it indicates that the value corresponding to the first key is hot data, and the SSD controller exits the current operation, that is, performs S902. If the update frequency of the value corresponding to the first key is less than the preset threshold, it indicates that the value corresponding to the first key is cold data, and the SSD controller continues to perform S903 and S904 to improve performance of the KV-SSD.

S902: The SSD controller exists the current operation.

S903: The SSD controller migrates the value currently corresponding to the first key to the QLC chip.

The read delay is not greatly affected even if the value currently corresponding to the first key is migrated to the QLC chip. Furthermore, a unit storage capacity of the QLC chip is larger than a unit storage capacity of the SLC chip. This effectively improves system performance.

S904: The SSD controller updates a physical address of the value currently corresponding to the first key in the metadata table to a physical address obtained after the migration.

In this embodiment, the SSD controller completes data migration in the same KV-SSD, and no bandwidth outside the disk is occupied, and a current service is not affected.

The foregoing mainly describes the solutions provided in the embodiments of the present invention from a perspective of the method. To realize the foregoing functions, a corresponding hardware structure and/or software module for performing each function is included. A person skilled in the art should easily be aware that, in combination with units and algorithm steps of the examples described in the embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments of the present invention, a key-value (KV) storage apparatus may be divided into function modules based on the foregoing method examples. For example, each function module may be obtained through division corresponding to each function, or two or more functions may be integrated into one processing module. The integrated module may be implemented in a form of hardware, or may be implemented in a form of a software function module. It should be noted that, in this embodiment of the present invention, module division is an example, and is merely a logical function division. In actual implementation, another division manner may be used.

Figure 10:
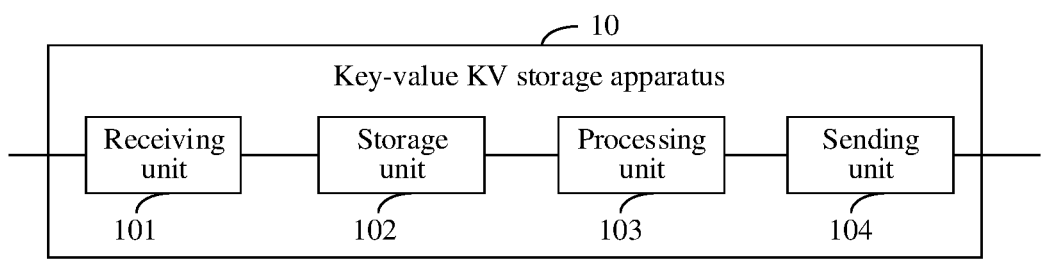
FIG. 10 is a schematic structural diagram of a key-value (KV) storage apparatus according to an embodiment of the present invention.

FIG. 10 is a schematic structural diagram of a key-value (KV) storage apparatus 10 according to an embodiment of the present invention. The key-value (KV) storage device 10 is configured to perform the key-value (KV) storage method shown in FIG. 3, FIG. 5, FIG. 6, FIG. 8, or FIG. 9. The storage device 10 of the key-value (KV) may include a receiving unit 101, a storage unit 102, and a processing unit 103.

The receiving unit 101 is configured to receive a write request, where the write request includes a first key and a first value, and the write request is used to request to write the first key and the first value. For example, with reference to FIG. 3, the receiving unit 101 may be configured to perform S300. The storage unit 102 is configured to: store, in a first memory chip, the first key received by the receiving unit 101, and store the first value in a second memory chip.

For example, with reference to FIG. 3, the storage unit 102 may be configured to perform S301. The processing unit 103 is configured to create a mapping relationship between the first key, a physical address of the first key, and a physical address of the first value, where the physical address of the first key is used to indicate that the first key is stored in storage space of the first memory chip, and the physical address of the first value is used to indicate that the first value is stored in storage space of the second memory chip. For example, with reference to FIG. 3, the processing unit 103 may be configured to perform S302.

Optionally, the receiving unit 101 is further configured to receive a first request, where the first request includes the first key, and the first request is used to request to process a value corresponding to the first key. For example, with reference to FIG. 5, FIG. 6, and FIG. 8, the receiving unit 101 may be configured to perform S500, S600, and S800.

Optionally, the processing unit 103 is further configured to: determine that the mapping relationship includes the first key, obtain, from the mapping relationship, the physical address of the first value corresponding to the physical address of the first key, and process the first value based on the physical address of the first value.

Optionally, the first request is specifically used to read the first value corresponding to the first key.

Optionally, the first request is specifically used to delete the first value corresponding to the first key. The processing unit 103 is specifically configured to add a first invalid identifier to the storage space indicated by the physical address of the first value. In addition, the processing unit 103 is further configured to: add a second invalid identifier to the storage space indicated by the physical address of the first key, and delete the mapping relationship. For example, with reference to FIG. 8, the processing unit 103 may be configured to perform S801, S803, S804, and S805.

Optionally, the first request further includes a second value, and the first request is specifically used to update the first value corresponding to the first key to the second value. The processing unit 103 is specifically configured to add a first invalid identifier to the storage space indicated by the physical address of the first value. In addition, the processing unit 103 is further configured to determine a first physical address, where the first physical address is used to indicate storage space in which no data is stored in the second memory chip. For example, with reference to FIG. 6, the processing unit 103 may be configured to perform S604 and S605. The storage unit 102 is configured to store the second value at the first physical address determined by the processing unit 103. For example, with reference to FIG. 6, the storage unit 102 may be configured to perform S605. The processing unit 103 is further configured to update the physical address of the first value in the mapping relationship to the first physical address. For example, with reference to FIG. 6, the processing unit 103 may be configured to perform S606.

Optionally, the processing unit 103 is further configured to: obtain an update frequency of the value corresponding to the first key within a preset period, if the update frequency is less than a preset threshold, migrate the value currently corresponding to the first key to the first memory chip, and update a physical address of the value corresponding to the first key in the mapping relationship to a physical address obtained after the migration. For example, with reference to FIG. 9, the processing unit 103 may be configured to perform S900 to S904.

Certainly, the key-value (KV) storage apparatus 10 provided in this embodiment of the present invention includes but is not limited to the foregoing modules. For example, the key-value (KV) storage apparatus 10 may further include a sending unit 104. The sending unit 104 may communicate with another device (for example, a host), for example, send a notification message 1.

During actual implementation, the receiving unit 101, the storage unit 102, the processing unit 103, and the sending unit 104 may all be implemented by invoking program code in the cache 103 by the processor 102 shown in FIG. 1. For a specific execution process, refer to the description of the key-value (KV) storage method shown in FIG. 3, FIG. 5, FIG. 6, FIG. 8, or FIG. 9. Details are not described herein again.

Another embodiment of the present invention further provides a computer-readable storage medium. The computer-readable storage medium stores instructions. When the instructions are run on a computer, the computer is enabled to perform the method shown in the foregoing method embodiment.

In another embodiment of the present invention, a computer program product is further provided. The computer program product includes computer instructions. When the instructions are run on a computer, the computer is enabled to perform the method shown in the foregoing method embodiment.

A person of ordinary skill in the art will understand that all aspects of the present invention or possible implementations of the aspects may be specifically implemented as a system, a method, or a computer program product. Therefore, aspects of the present invention or possible implementations of the aspects may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation of each aspect may take a form of a computer program product, where the computer program product refers to computer-readable program code stored in a computer-readable medium.

The computer-readable medium includes but is not limited to an electronic, magnetic, optical, electromagnetic, infrared, or semiconductor system, device, or apparatus, or any appropriate combination thereof, such as a random access memory (RAM), a read-only memory (ROM), an erasable programmable read-only memory (EPROM), and an optical disc.

The processor in the computer reads the computer-readable program code stored in the computer-readable medium, so that the processor can perform a function action specified in each step or a combination of the steps in the flowcharts.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

What is claimed is:

1. A key-value (KV) storage method, comprising:
   receiving a write request, wherein the write request is associated with writing a first key and a first value;
   storing the first key in a first memory chip of a solid state drive (SSD), and storing the first value in a second memory chip of the SSD, based on an erase count of the first memory chip being less than an erase count of the second memory chip; and
   creating a mapping relationship between the first key, a physical address of the first key, and a physical address of the first value, wherein the physical address of the first key indicates that the first key is stored in storage space of the first memory chip, and wherein the physical address of the first value indicates that the first value is stored in storage space of the second memory chip.

2. The storage method according to claim 1, further comprising:
   receiving a first request, wherein the first request comprises the first key, and wherein the first request requests processing of a value corresponding to the first key;
   determining that the mapping relationship comprises the first key;
   obtaining, from the mapping relationship, the physical address of the first value corresponding to the physical address of the first key; and
   processing the first value based on the physical address of the first value.

3. The storage method according to claim 2, wherein the first request is associated with reading the first value corresponding to the first key.

4. The storage method according to claim 2, wherein the first request is associated with deleting the first value corresponding to the first key;
   wherein the processing the first value based on the physical address of the first value comprises:
      adding a first invalid identifier to the storage space indicated by the physical address of the first value; and
   wherein the method further comprises:
      adding a second invalid identifier to the storage space indicated by the physical address of the first key; and
      deleting the mapping relationship.

5. The storage method according to claim 2, wherein the first request further comprises a second value, and wherein the first request is associated with updating the first value corresponding to the first key to the second value;
   wherein the processing the first value based on the physical address of the first value comprises:
      adding a first invalid identifier to the storage space indicated by the physical address of the first value; and
   wherein the method further comprises:
      determining a first physical address, wherein the first physical address indicates storage space in which no data is stored in the second memory chip;

storing the second value at the first physical address; and updating the physical address of the first value in the mapping relationship to the first physical address.

6. The storage method according to claim 1, further comprising:

obtaining an update frequency of a value corresponding to the first key within a preset period;

migrating the value currently corresponding to the first key to the first memory chip in response to the update frequency being less than a preset threshold; and updating a physical address of the value corresponding to the first key in the mapping relationship to a physical address obtained after the migration.

7. A key-value (KV) storage apparatus comprising:

a first memory chip;

a second memory chip;

a processor coupled to the first memory chip and the second memory chip, wherein the processor is configured to:

receive a write request, wherein the write request is associated with requesting to write a first key and a first value;

store, in the first memory chip, the first key, and store the first value in the second memory chip, based on an erase count of the first memory chip being less than an erase count of the second memory chip; and create a mapping relationship between the first key, a physical address of the first key, and a physical address of the first value, wherein the physical address of the first key indicates that the first key is stored in storage space of the first memory chip, and wherein the physical address of the first value indicates that the first value is stored in storage space of the second memory chip.

8. The storage apparatus according to claim 7, wherein the processor is further configured to:

receive a first request, wherein the first request comprises the first key, and wherein the first request requests processing of a value corresponding to the first key;

determine that the mapping relationship comprises the first key;

obtain, from the mapping relationship, the physical address of the first value corresponding to the physical address of the first key; and process the first value based on the physical address of the first value.

9. The storage apparatus according to claim 8, wherein the first request is associated with reading the first value corresponding to the first key.

10. The storage apparatus according to claim 8, wherein the first request is associated with deleting the first value corresponding to the first key; and wherein the processor is further configured to:

add a first invalid identifier to the storage space indicated by the physical address of the first value;

add a second invalid identifier to the storage space indicated by the physical address of the first key; and delete the mapping relationship.

11. The storage apparatus according to claim 8, wherein the first request further comprises a second value, and wherein the first request is associated with updating the first value corresponding to the first key to the second value; and wherein the processor is further configured to:

add a first invalid identifier to the storage space indicated by the physical address of the first value;

determine a first physical address, wherein the first physical address indicates storage space in which no data is stored in the second memory chip;

store the second value at the first physical address; and update the physical address of the first value in the mapping relationship to the first physical address.

12. The storage apparatus according to claim 7, wherein the processor is further configured to:

obtain an update frequency of a value corresponding to the first key within a preset period;

migrate the value currently corresponding to the first key to the first memory chip in response to the update frequency being less than a preset threshold; and update a physical address of the value corresponding to the first key in the mapping relationship to a physical address obtained after the migration.

13. The storage apparatus according to claim 7, wherein the first memory chip has a write delay that is longer a write delay of the second memory chip.

14. A key-value (KV) storage apparatus comprising:

a first memory chip;

a second memory chip;

a processor coupled to the first memory chip and the second memory chip; and a non-transitory computer readable medium storing a program for execution by the processor, the program including instructions to:

receive a write request, wherein the write request is associated with requesting to write a first key and a first value;

store, in the first memory chip, the first key, and store the first value in the second memory chip, based on an erase count of the first memory chip being less than an erase count of the second memory chip; and create a mapping relationship between the first key, a physical address of the first key, and a physical address of the first value, wherein the physical address of the first key indicates that the first key is stored in storage space of the first memory chip, and wherein the physical address of the first value indicates that the first value is stored in storage space of the second memory chip.

15. The storage apparatus according to claim 14, wherein the program further incudes instructions to:

receive a first request, wherein the first request comprises the first key, and wherein the first request requests processing of a value corresponding to the first key;

determine that the mapping relationship comprises the first key;

obtain, from the mapping relationship, the physical address of the first value corresponding to the physical address of the first key; and process the first value based on the physical address of the first value.

16. The storage apparatus according to claim 15, wherein the first request is associated with reading the first value corresponding to the first key.

17. The storage apparatus according to claim 15, wherein the first request is associated with deleting the first value corresponding to the first key; and wherein the program further includes instructions to:

add a first invalid identifier to the storage space indicated by the physical address of the first value;

add a second invalid identifier to the storage space indicated by the physical address of the first key; and delete the mapping relationship.

18. The storage apparatus according to claim 15, wherein the first request further comprises a second value, and wherein the first request is associated with updating the first value corresponding to the first key to the second value; and wherein the program further includes instructions to:
add a first invalid identifier to the storage space indicated by the physical address of the first value;
determine a first physical address, wherein the first physical address indicates storage space in which no data is stored in the second memory chip;
store the second value at the first physical address; and
update the physical address of the first value in the mapping relationship to the first physical address.

19. The storage apparatus according to claim 14, wherein the program further includes instructions to:
obtain an update frequency of a value corresponding to the first key within a preset period;
migrate the value currently corresponding to the first key to the first memory chip in response to the update frequency being less than a preset threshold; and
update a physical address of the value corresponding to the first key in the mapping relationship to a physical address obtained after the migration.

20. The storage apparatus according to claim 14, wherein the first memory chip has a write delay that is longer a write delay of the second memory chip.

* * * * *